United States Patent Office 3,286,394
Patented Nov. 22, 1966

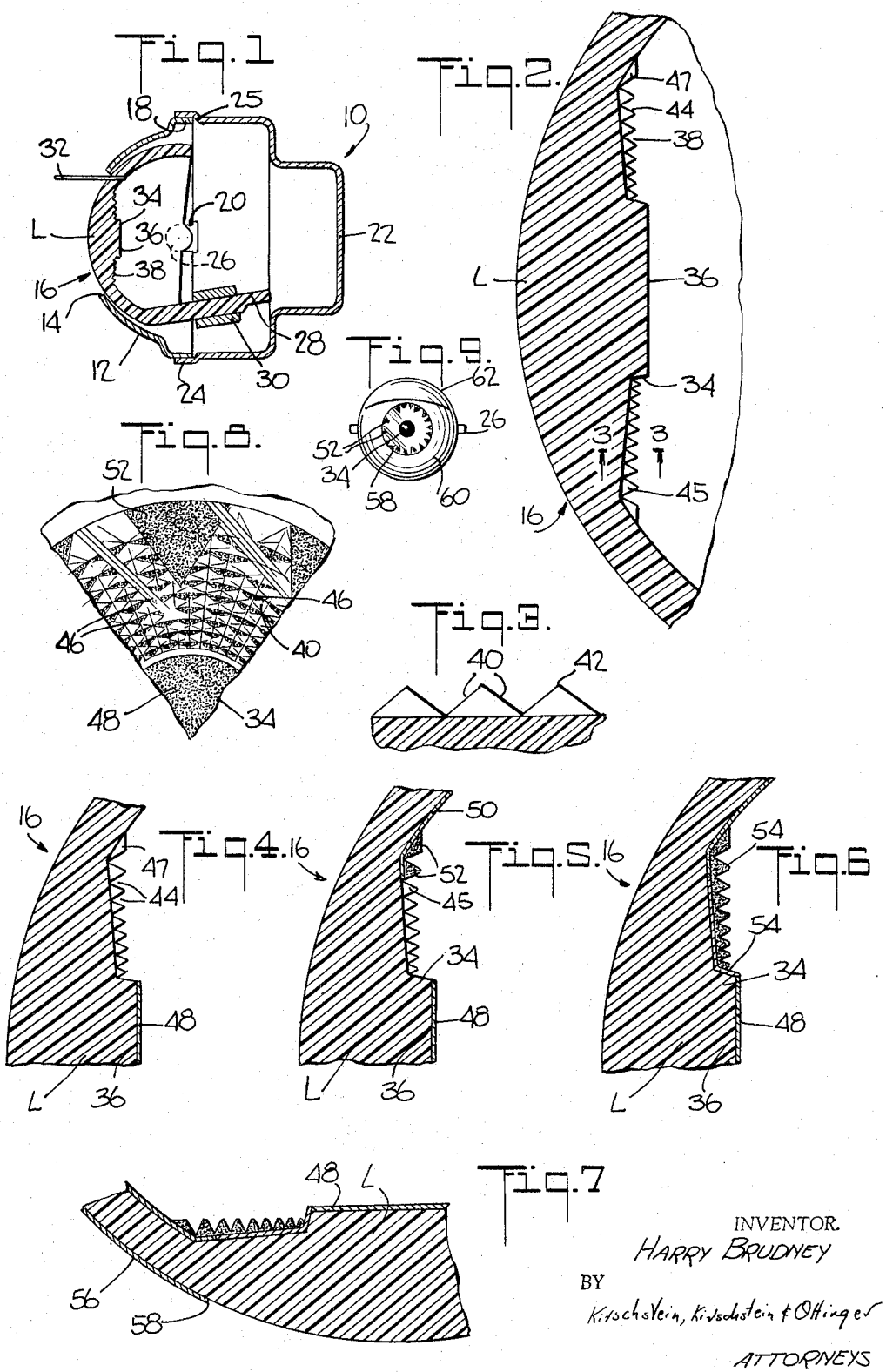

3,286,394
DOLL'S EYE WITH PEARLESCENT IRIS
Harry Brudney, New York, N.Y., assignor to Jacoby-Bender, Inc., Woodside, N.Y., a corporation of New York
Filed Mar. 19, 1964, Ser. No. 353,130
7 Claims. (Cl. 46—169)

This invention relates to a doll's eye, and more particularly my invention pertains to a doll's eye of the "painted" type, as distinguished from dolls' eyes of the "reflecting" type, these latter being shown, for example, in my United States Letters Patent No. 2,753,660 issued July 10, 1956. Even more specifically, my present invention is concerned with the eyeball and lens of a painted doll's eye.

The painted doll's eye of this invention can be employed in various manners, as for instance, as a fixed, that is to say, non-sleeping, eye, or in a sleeping eye set, this being a set constituting a pair of eyes joined for common oscillation, or as an individually movable eye which is a single oscillatable eye that is mounted for rotation independently of another eye of a pair of eyes. Solely for the purpose of illustration, my invention will be described hereinafter in connection with an individually movable eye, although it is, of course, to be understood that the invention is not to be so limited.

A painted eye of my instant invention is characterized by the provision of an eyeball consisting of a hollow generally hemispherically shaped body molded of a transparent synthetic plastic resin. The eyeball is provided with a lens portion formed by a rearwardly thickened central portion, whereby to provide a pupil area the back of which is rendered non-reflecting by coating its rear surface with a light absorbing material, for instance, a dark paint, to thereby impart a dark appearance to the pupil in simulation of the pupil of a human eye.

The rearwardly built-up center or lens of the eyeball also provides for an iris area surrounding the pupil area, the back of the iris area being so configured and painted as to provide internal means for the modulation and outward reflection of light incident thereon.

Heretofore, in order to obtain light reflecting properties at the iris area in a "reflecting" eye, the rearward thickening of the body of the eyeball has been in the configuration of a frusto-conical mass the center of which constituted the pupil and the conical surface of which constituted the iris. It was customary to provide such conical surface with radial serrations forming prismatic ribs.

The formation of the iris as above described was deliberately adopted in order to obtain total internal reflectivity, without painting, and consequent brilliance in external appearance. I have found, however, that although such radial prismatic formation of the iris secures a highly desirable glowing appearance which may be flecked by the inclusion of non-reflecting islands, and softened by imparting a mat (finely irregular diffuse) finish, some people consider such an iris to be too regular and mechanistic.

My present invention is, therefore, concerned with and directed to the provision of a painted doll's eye having an eyeball lens the iris of which is so formed as to provide a mottled look of lesser intensity than even a softened reflecting eye and the pattern of which seems to vary with the point of view of the observer, so that the new eye is, in effect, of the so-called "illusion" type the appearance of which will vary with the point of view of the observer.

It is an object of my present invention to provide a doll's eye of the character described with a lens the iris of which has a soft mellow appearance that closely resembles the appearance of a human eye and which is devoid of even the semblance of harshness or glare.

It is another object of my present invention to provide a painted doll's eye of the character described wherein the lens has a background pattern of small irregularities which are of a size that are visible to the eye, i.e., will not blend together, but which are small enough not to be unduly noticed or to call attention to themselves, so that the background of the iris presents the mottled look to which reference heretofore was made.

It is another object of my present invention to provide a painted doll's eye having a lens portion the iris of which may be readily and easily produced in a great variety of patterns and of colors and shades of colors without relying upon the tinting of the plastic resins from which the eye is formed and therefore in a far greater variety than could be obtained by such tinting.

It is another object of my present invention to provide a painted doll's eye of the character described having a lens with an iris of which the periphery is internally irregularly notched in a color that contrasts with the color of the remainder of the iris, whereby to more faithfully simulate a human eye.

It is another object of my present invention to provide a method for producing a painted doll's eye of the character described on a large scale, with ease and facility, at great speeds and with low costs.

Other objects of my invention in part will be obvious and in part will be pointed out hereinafter.

My invention accordingly consists in the features of construction, combinations of elements, arrangements of parts and series of steps which will be exemplified in the doll's eye and method hereinafter described and of which the scope of application will be indicated in the appended claims.

In the accompanying drawings in which is shown one of the various possible embodiments of my invention, FIG. 1 is a vertical sectional view through a doll's eye whose eyeball is made in accordance with the present invention;

FIG. 2 is an enlarged fragmentary sectional view of the eyeball of the doll's eye in the region of the lens portion thereof;

FIG. 3 is an enlarged sectional view view taken along the line 3—3 of FIG. 2;

FIG. 4 is a fragmentary vertical section through a portion of the lens of the eyeball after a first step in the production thereof;

FIG. 5 is a view similar to FIG. 4, but showing the lens of the eyeball after a second step in the production thereof;

FIG. 6 is a view similar to FIG. 4, but showing the lens of the eyeball after a third step in the production thereof;

FIG. 7 is a view similar to FIG. 4, but showing the lens of the eyeball after the final step in the production thereof;

FIG. 8 is an enlarged fragmentary front view of the finished eyeball showing a portion of the pupil and of the iris as they appear on completion; and FIG. 9 is a front elevational view on a reduced scale of the completed doll's eye of the invention.

Referring now in detail to the drawings, the reference numeral 10 denotes an individually movable doll's eye assembly of standard construction, except for the eyeball lens, the same being, save for insignificant details of construction, of the type shown and described in my aforesaid Letters Patent No. 2,753,660. This construction will be briefly described only for the purpose of completeness. The eye assembly includes a molded generally shell shaped or hemispherical plastic socket 12 for an eyeball, the socket having a front opening 14 through which the eyeball 16 is visible. The socket 12 functions as the front half of a casing for the eyeball. Said socket is open at its rear and is there provided with a cylindrical marginal back portion or rim 18, the latter including a pair of grooves 20 that run forwardly from their open ends at the rear edge of the socket.

A rear sheet metal section 22 of the casing which is of stepped cylindrical cup shape is formed with a rim portion 24 of enlarged diameter that frictionally fits over the rim portion 18 of the socket and that provides a shoulder 25 against which the edge of the rim 18 abuts. The shoulder 25 also closes the open rear ends of the grooves 20.

As is conventional, the eyeball 16 is made, preferably by an injection molding process, from a transparent synthetic plastic resin, for instance, cellulose acetate, cellulose acetate butyrate, or an acrylic resin. The plastic resin may be untinted, or, if desired, slightly tinted. The eyeball 16 constitutes a substantially hemispherical generally thin-walled shell provided with outwardly extending diametrically opposed trunnions near its open rear end, the tips of the trunnions 26 being captively received and rotatably supported in the grooves 20. The eyeball 16 further is formed to include an integral rearwardly extending lower tail 28 upon which a suitable counterweight 30, as, for instance, a strip of lead, is secured, as by clamping. Optionally, an eyelash 32 may be provided on the eyeball, the same either being molded as an integral part thereof or being separately formed from a multiplicity of individual strands and inserted into a slit formed in the eyeball to receive the eyelash.

It will be appreciated that the general construction and assembly of the doll's eye as described above is entirely conventional and has been detailed only in order to set forth the environment in which may invention is utilized, the invention residing exclusively in the detailed physical configuration of the eyeball alone.

Said eyeball 16 includes a lens portion L at its center. The lens portion is formed by a rear thickening of the hemispherical front wall section of the shell. The thickened portion of the shell includes a central portion formed with a rearwardly extending squat cylindrical protuberance 34 defining the pupil of the eye and provided with a flat smooth circular rear surface 36. The lens portion further comprises a broad annular area 38 that surrounds the forward end of the cylindrical pupil protuberance 34 and lies in a plane substantially parallel to the rear surface 36 of the pupil or very slightly forwardly sloping therefrom. Such annular area 38 constitutes the iris of my improved eye.

In order to impart a mottled, that is to say, variegated, appearance to the iris 38 of the lens, the rear surface thereof is serrated in a novel manner, namely, by providing thereon two groups of serrations. The first group is in the form of contiguous V-shaped radial grooves 40 (see FIG. 3) the sides of which are planar and intersect at angles of about 90° to form contiguous radial prismatic ridges 42. The grooves 40 are shallowest at the pupil 34 and gradually increase in depth (see, for example, FIG. 2) to a maximum depth at the periphery of the iris area 38. By way of example, the grooves are about eight thousandths of an inch deep in the vicinity of the pupil and about fifteen thousandths of an inch deep at the periphery of the iris area. Due both to the outwardly increasing depth of the grooves 40 and to their radial configuration, the widths of the grooves as viewed from the front of the eye (see FIG. 8) increase outwardly. By way of example, there are thirty grooves 40 in a typical doll's eye embodying my invention and the width of a groove adjacent the pupil area is about fifteen thousandths of an inch and adjacent the periphery of the iris area is about forty thousandths of an inch. The bases of the grooves 40, and, therefore, the apices of the prismatic ridges 42, lie in a common surface which substantially constitutes a plane that is parallel to the rear iris surface 36.

The second group of serrations is in the form of contiguous V-shaped grooves 44 that are circular and concentric, centering on the pupil 34 and forming contiguous annular ridges 45. The grooves 44 of the second set intersect the grooves 40 of the first set. The sides of the grooves 44 are frusto-conical and intersect at angles of about 60°. The grooves 44 are shallowest adjacent the pupil and gradually increase in depth toward the periphery of the iris. The depths of the grooves 44 match the depths of the grooves 40 at each intersection so that at any given intersection the bases and crests of the resultant ridges 42, 45 coincide. The intersecting grooves 40, 44 cooperate to subdivide the iris area, i.e. the grooves 44 divide the ridges 42, into a large number of rearwardly extending pyramidal projections 46 the bases of all of which are disposed in a shallow cone centered on the pupil and the tips of all of which are disposed on a substantially flat plane parallel to the rear surface of the pupil. Each pyramidal projection has four sides (two radial and two conical) converging rearwardly to a pointed apex. These pyramidal projections are multitudinous, a typical eye having thirty grooves 40 and nine grooves 44 providing a total of two hundred and seventy projections 46. Furthermore the projections 46 are quite tiny. By way of example in a good sized eye with a hemispherical diameter of about three-quarters of an inch, a pupil diameter of 0.150 inch, an iris periphery diameter of 0.390 inch, thirty radial grooves, nine annular grooves and groove depths as specified above, the innermost ring of projections 46 will have bases of about 0.007 by 0.015 inch and the outermost ring of projections will have bases of about 0.015 by 0.040 inch. The pyramidal projections are arranged as described in a composite multiradial and multiannular pattern; but because of the small sizes of the projections, the projections tend to blend into one another, unless carefully examined, whereby due to such multifaceting, to break the annular iris area up into a host (in the typical example over one thousand) variously oriented tiny surfaces that create a variegated effect when viewed from the front of the eye.

Additionally, a prismatic circular ridge 47 may be provided on the rear surface of the eyeball immediately surrounding the iris area.

In order to minimize and substantially eliminate any harshness and glare in the external appearance of the iris 38 and to closely simulate the appearance of a human eye, the rear surface of the eyeball shell shaped as aforesaid, is treated as follows:

The rear surface 36 of the pupil 34 is, preferably as the first step (see FIG. 4) subsequent to molding, coated, as by spraying, daubing or printing, with a layer 48 of a light-absorbing material which may comprise a dark, e.g. black, paint.

The rear surface of the eyeball 16 surrounding the iris 38 next is coated (see FIG. 5) with a layer 50 of an opaque paint of any desired color, preferably of a color different from the iris color next to be described. The layer 50 preferably is formed with an irregularly-shaped inner periphery, i.e. margin, that at intervals crosses the periphery of the iris area so as to provide irregularly-shaped and irregularly spaced projections 52 of the painted layer 50 extending inwardly across the marginal peripheral portion of the iris 38. The painted layer 50 can readily be applied by spraying with a mask held over the portion of the iris not yet colored.

After the rear surface of the eyeball has had the layers 48, 50 applied thereto, the still unpainted portion of the iris is coated, as by spraying, with a layer 54 of a pearlescent paint (see FIG. 6). Such pearlescent paint, i.e. a paint with a shimmering luster, which now covers the remaining clear rear surface of the multifaceted iris between the pupil and the irregular inner margin of the layer 50, is a nacreous paint, namely, one formed by dispersing a natural or artificial nacreous pigment in a liquid vehicle including a clear film-forming resin dissolved in a volatile solvent. Suitable pigments are very thin crystalline platelets of lead carbonate, lead arsenate, or ground natural guanine, pearl or oyster linings. Suitable resins are vinyl resins, acrylic resins, polyester resins, polyethylene, nitro cellulose, cellulose acetate and cellulose acetate butyrate. The solvents for these resins are conventional. Numerous forms of pearlescent paints and lacquers are readily available on the market and it is, therefore, not necessary to further detail the same. The pearlescent paint (or lacquer) may be of any desired color.

The pearlescent layer 54 covering the rear variably multifaceted iris surface will, by virtue of its shimmering luster, eliminate substantially any harshness and glare from the iris and impart a soft and mellow appearance to the variegated iris surface in close simulation of the appearance of the iris of a human eye. The combination of the variously oriented pyramidal projections and the pearlescent layer 54 creates a soft mottled effect and creates a play of shades that varies with the point of view of the observer.

It also will be clear that the projections 52 of the paint layer 50 extending peripherally inward in spaced relation to one another into the marginal edge portion of the iris under the pearlescent layer 54 will provide an irregular rim for the iris in simulation of the internally irregular periphery of a human iris.

It will be further clear that, since the paint constituting the coating 50 and the pearlescent paint 54 covering the iris may be varied in color and shade of color, to an almost unlimited extent, the coloration of the iris may be varied to substantially the same unlimited extent, without the need for tinting and varying the composition of the material forming the eyeball shell 16.

The final painting step (see FIG. 7) is to coat the front surface of the eyeball 16 with a layer 56 of an opaque paint, leaving an unpainted opening 58 of generally circular configuration. The layer 56 may be all white to simulate the sclera of a human eye or may be partly white as at 60 (FIG. 9) and partly flesh colored as at 62 to resemble an eyelid. The opening 58 is of smaller diameter than the iris periphery and is spaced slightly radially inwardly from the periphery of the iris area so as to conceal the same when viewed from the front. If a flesh colored area 62 is employed, its inner edge may approach more closely to the pupil than the edge of the sclera area 60 in simulation of a human eyelid.

Although the layer 56 has been widely used in prior dolls' eyes, it performs two novel functions in combination with an eye of the present invention. Thus, said layer conceals the radially outwardly disposed bases of the projections 52 so that each projection is separated from and apparently unrelated to its adjacent projections (see FIG. 9). Thereby there are imparted to the eye characteristically human radial irregularities. The layer also, since it is spaced forwardly of the periphery of the iris, shadows the margin of the iris and, as a consequence, forms a gradually radially outwardly darkening narrow circumscribing band around the iris that likewise closely resembles the rim of the iris of a human eye.

This completes the description of the reflecting doll's eye of the present invention, and of the method by which it is formed. It will be readily apparent that the doll's eye of the invention provides an eyeball having a lens portion of brilliance and yet of soft and pleasing, humanlike appearance. It will also be apparent that the doll's eye of the invention may have its lens portion made up in a great variety of colors and shades of color, in close simulation to the variations in coloring of the human eye, without in any way requiring the alteration of the composition of the material from which the eyeball is formed or in any way changing its shape or form, to effect such variations. It will likewise be apparent that the reflecting doll's eye of the invention may be formed by methods that are simple and easy and relatively inexpensive to practice.

It thus will be seen that I have provided a device and method which achieve the several objects of my invention and which are well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and desire to secure by Letters Patent:

1. An eyeball for a doll's eye, said eyeball comprising a lens portion formed of a transparent material, said lens portion having a convex front surface and having a rear surface including an annular area defining an iris, said annular area surrounding a central area defining a pupil, said annular iris area having a plurality of contiguous radial grooves radiating from the pupil and a plurality of contiguous annular grooves intersecting said radial grooves, said radial and said annular grooves being of matching depths and breaking up said annular iris area into a multitude of rearwardly extending pyramidal projections, a layer of pearlescent material covering the annular iris area, the front surface of the eyeball being covered with a layer of opaque material having an opening therethrough of slightly smaller diameter than the annular iris area, said opening being concentric with said annular iris area, the rear surface of the eyeball surrounding the lens portion having a layer of opaque material thereon of a color different from the pearlescent material, the inner edge of said layer being formed with projections extending over the adjacent marginal edge of the annular iris area and under the layer of pearlescent material.

2. An eyeball for a doll's eye, said eyeball comprising a lens portion formed of a transparent material, said lens portion having a convex front surface and having a rear surface including an annular area defining an iris, said annular iris area surrounding a central area defining a pupil, said annular iris area being broken up into a multitude of variously arranged rearwardly extending contiguous pyramidal projections, and a layer of pearlescent material covering said annular iris area, the front surface of the eyeball being covered with a layer of opaque material having an opening therethrough of slightly smaller diameter than the annular iris area, said opening being concentric with said annular iris area, the rear surface of the eyeball surrounding the lens portion having a layer of opaque material thereon of a color different from the pearlescent material, and the inner edge of said layer being formed with projections extending over the adjacent marginal edge of the annular iris area and under the layer of pearlescent material.

3. An eyeball for a doll's eye, said eyeball comprising a lens portion formed of a transparent material, said lens portion having a convex front surface and having a rear surface including an annular area defining an iris and surrounding a central area defining a pupil, said annular iris area having a serrated rear surface and a layer of pearlescent material covering said annular iris area, the front surface of the eyeball being covered with a layer of opaque material having an opening therethrough of slightly smaller diameter than the annular iris area, said opening being concentric with said annular iris area, the rear surface of the eyeball surrounding the lens portion having a layer of opaque material thereon of a color different from the pearlescent material, the inner edge of said layer being formed with projections extending over the adjacent marginal edge of the annular iris area and under the layer of pearlescent material.

4. An eyeball for a doll's eye, said eyeball comprising a lens portion formed of a transparent material, said lens portion having a convex front surface and having a rear surface including an annular area defining an iris and surrounding a central area defining a pupil, said annular iris area having a serrated rear surface and a layer of pearlescent material covering said annular area, the rear surface of the eyeball surrounding the lens portion having a layer of opaque material thereon of a color different from the pearlescent material, the inner edge of said layer being formed with irregularly shaped and irregularly spaced projections extending over the adjacent marginal edge portion of the annular iris area and under the layer of pearlescent material.

5. An eyeball for a doll's eye, said eyeball comprising a lens portion formed of a transparent material, said lens portion having a convex front surface and having a rear surface including an annular area defining an iris, said annular area surrounding a central area defining a pupil, said annular area being broken up into a multitude of variously arranged rearwardly extending contiguous tiny pointed pyramidal projections, and a layer of pearlescent material covering said annular iris area.

6. An eyeball as set forth in claim 5 wherein the pyramidal projections are arranged annularly and radially with respect to the pupil.

7. An eyeball as set forth in claim 5 wherein the pyramidal projections are progressively larger as a function of their distance from the pupil.

References Cited by the Examiner

UNITED STATES PATENTS

| | | | |
|---|---|---|---|
| 1,511,140 | 10/1924 | Sauvage | 63—32 |
| 2,254,232 | 9/1941 | Marcus | 46—165 |
| 2,353,744 | 7/1944 | Meyer. | |
| 2,657,500 | 11/1953 | Samolewitz | 46—169 |
| 3,092,931 | 6/1963 | Samo | 46—169 |

RICHARD C. PINKHAM, *Primary Examiner.*

F. BARRY SHAY, *Examiner.*